R. H. STEVENS.
HOT METAL CAR.
APPLICATION FILED AUG. 8, 1918.

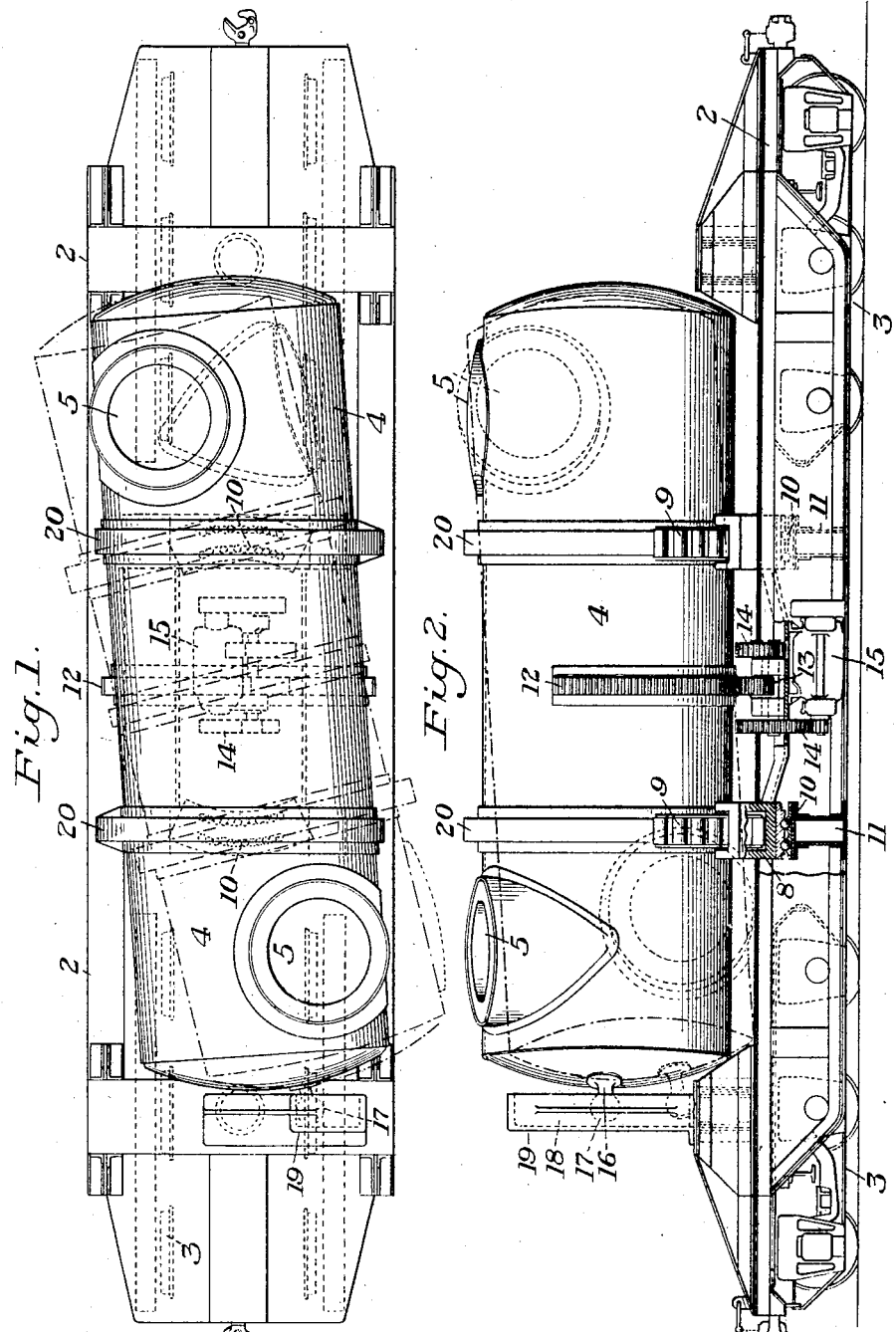

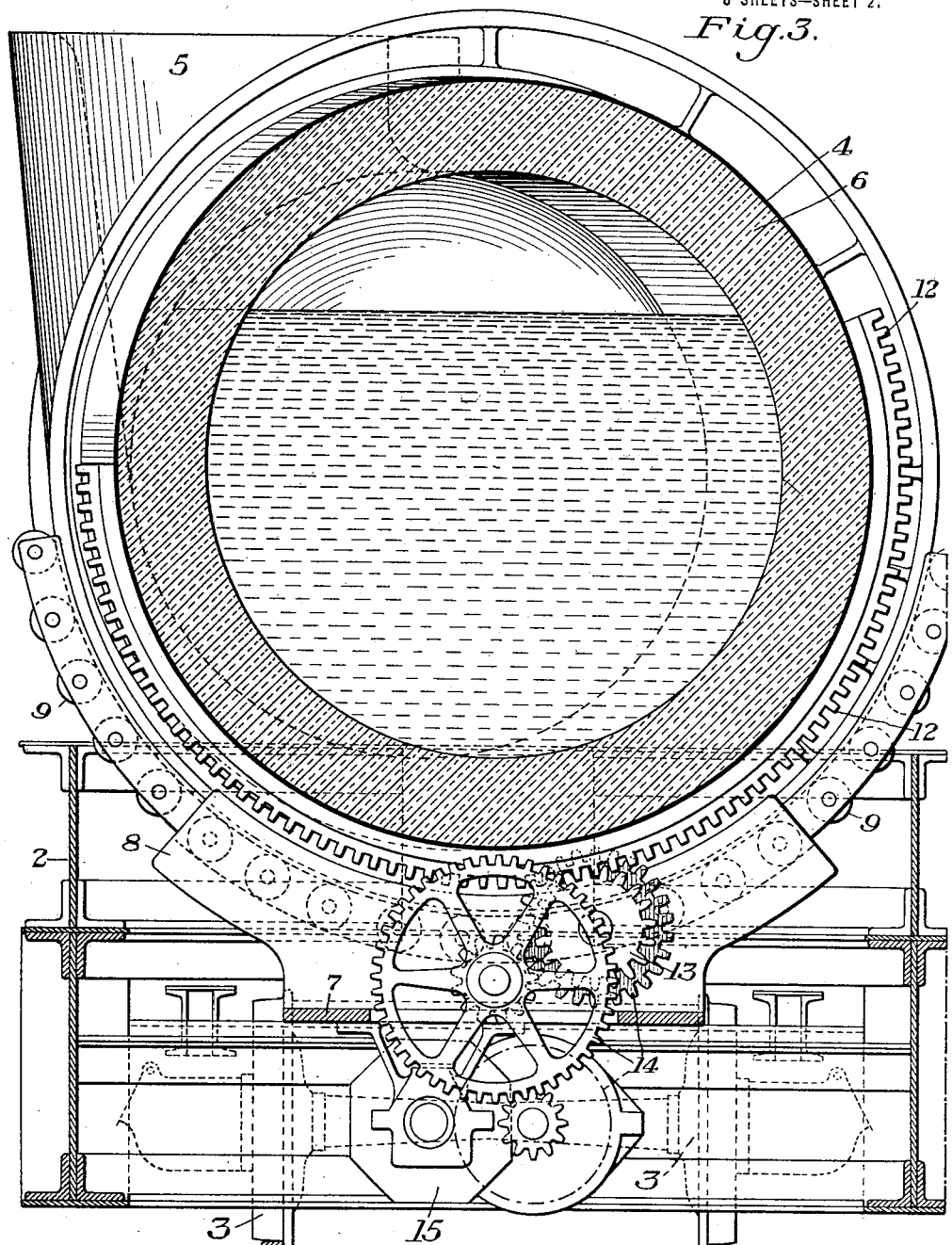

1,332,772.  Patented Mar. 2, 1920.
8 SHEETS—SHEET 3.

WITNESSES
INVENTOR
R. H. Stevens,

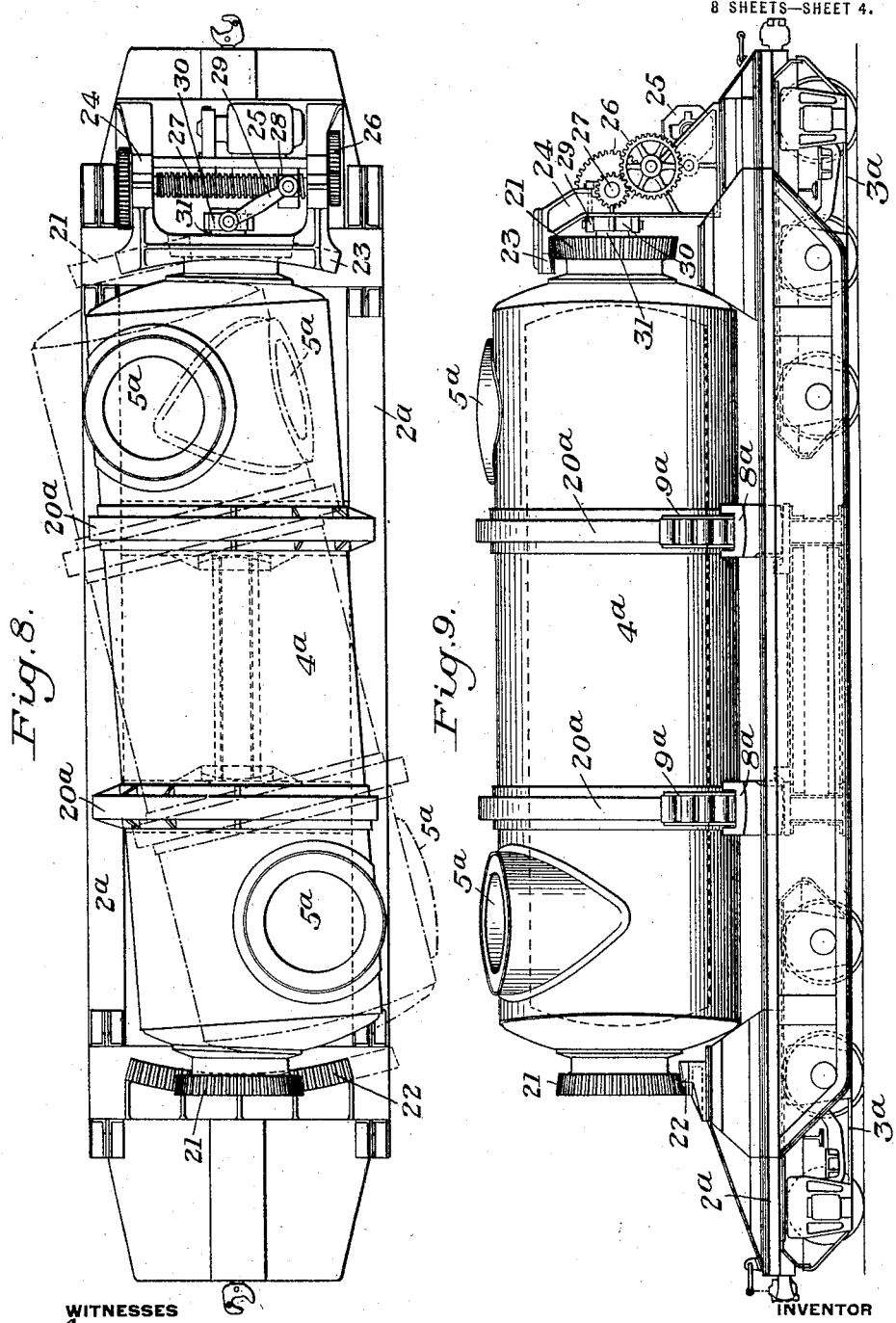

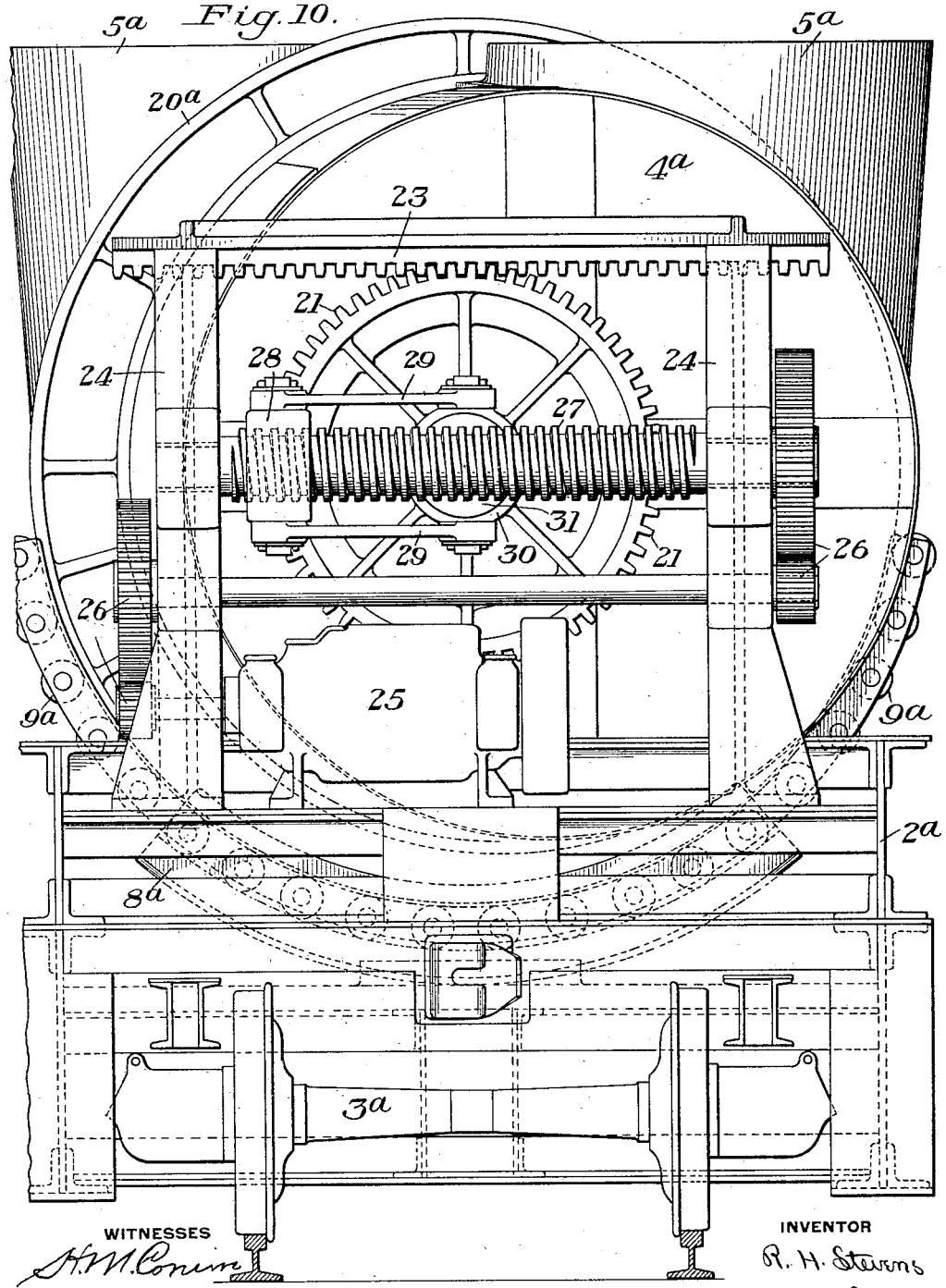

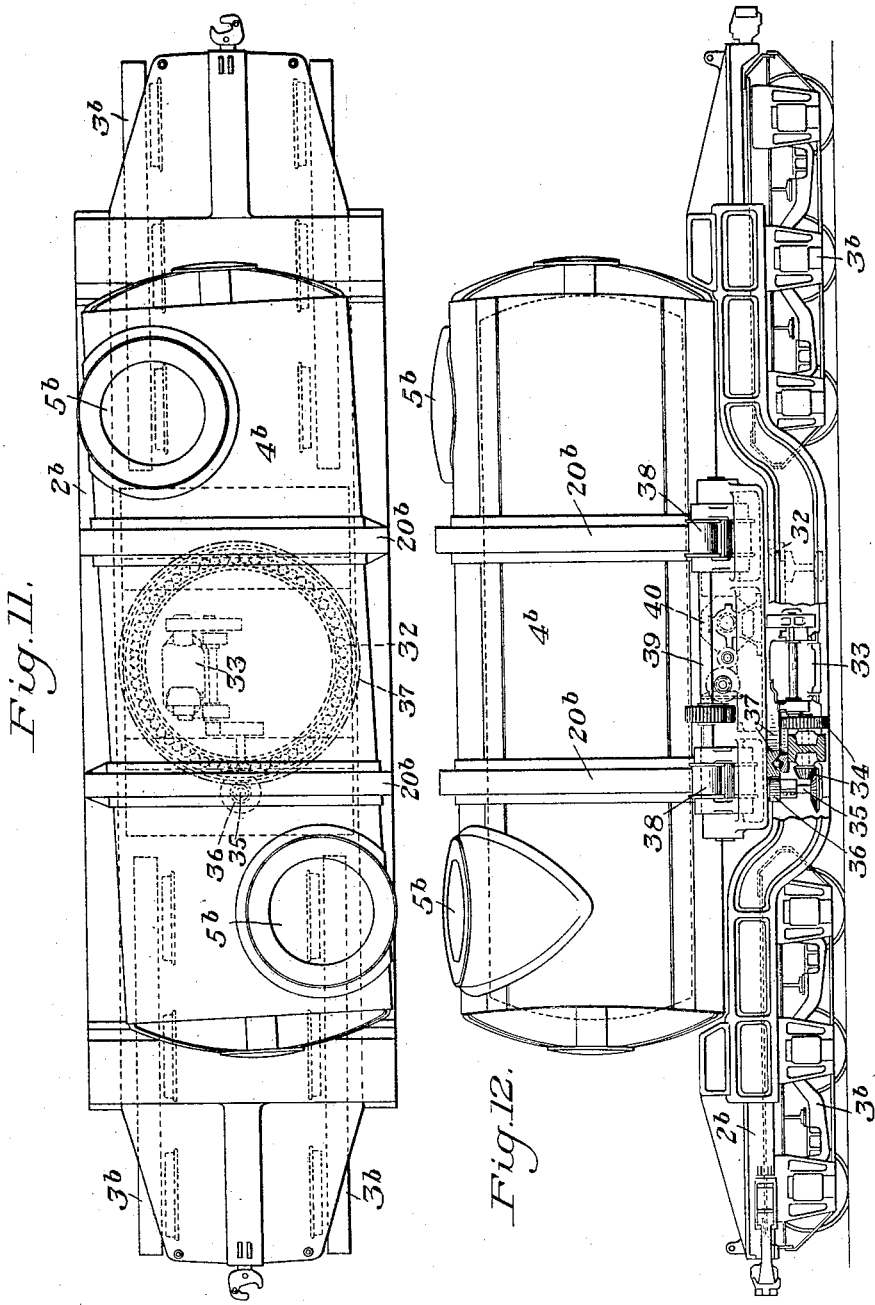

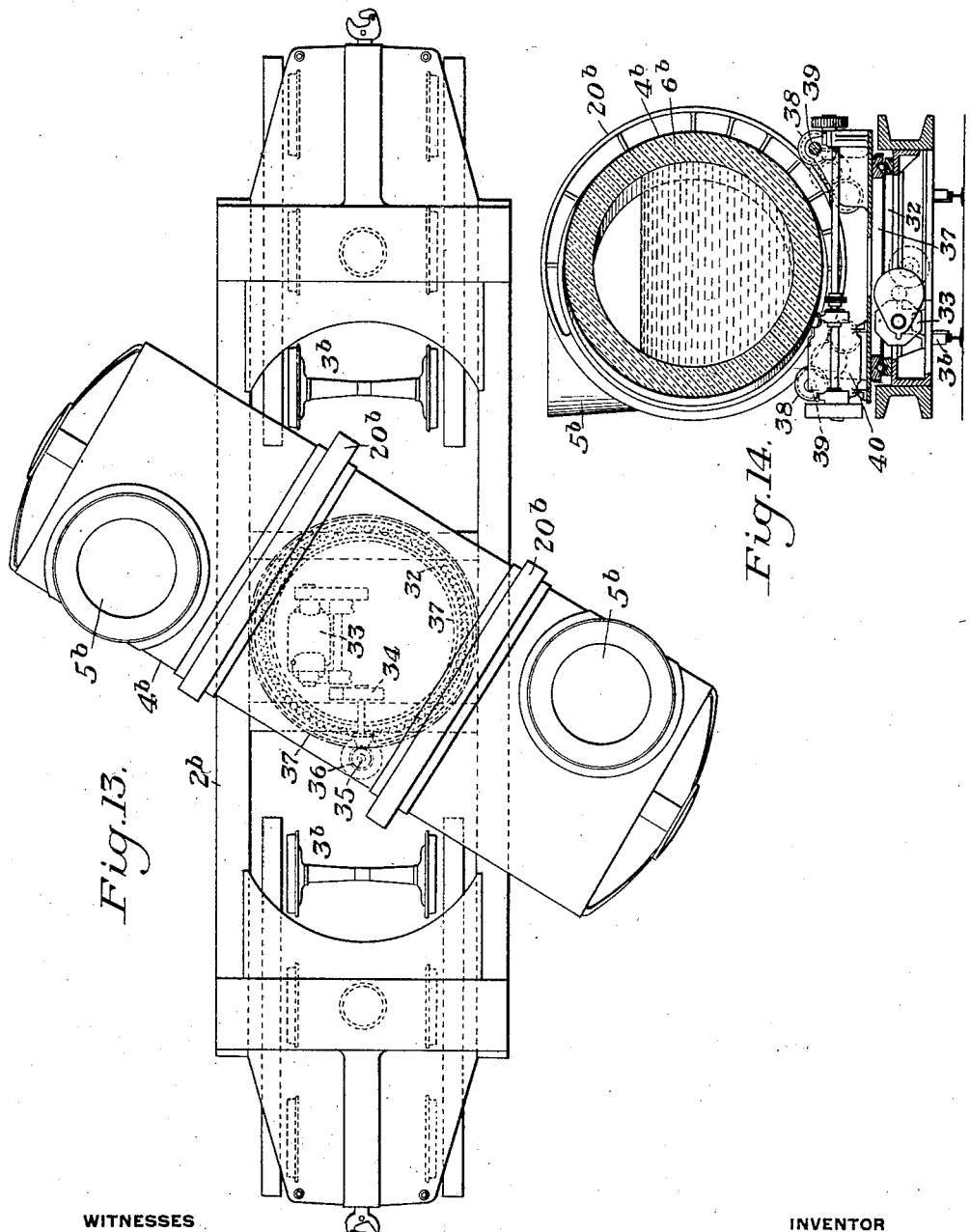

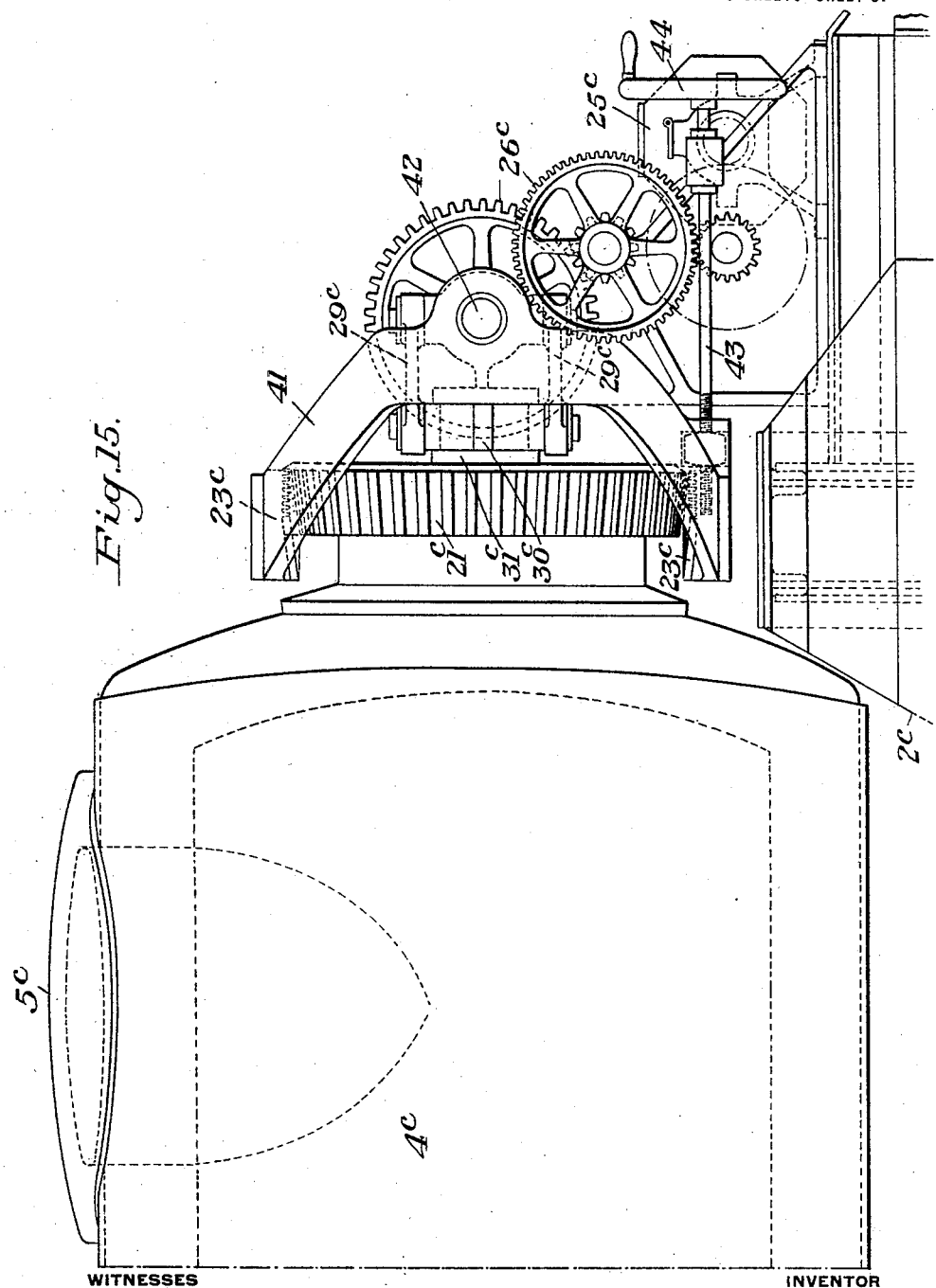

UNITED STATES PATENT OFFICE.

RICHARD H. STEVENS, OF PHILADELPHIA, PENNSYLVANIA.

HOT-METAL CAR.

1,332,772.  Specification of Letters Patent.  Patented Mar. 2, 1920.

Application filed August 8, 1918. Serial No. 248,883.

*To all whom it may concern:*

Be it known that I, RICHARD H. STEVENS, a resident of Philadelphia, in the county of Philadelphia and State of Pennsylvania, have invented a new and useful Improvement in Hot-Metal Cars, of which the following is a full, clear, and exact description, reference being had to the accompanying drawings, forming part of this specification, in which—

Figure 1 is a plan view, and Fig. 2 is a side elevation of one form of car embodying my invention;

Fig. 3 is a transverse vertical section of the same on a larger scale;

Figs. 8 and 9 are views similar to Figs. 1 and 2, respectively, but showing a modification;

Fig. 10 is an end elevation of the car shown in Figs. 8 and 9;

Fig. 11 is a plan view, and Fig. 12 is a side elevation showing still another form of car embodying my invention;

Fig. 13 is a plan view, and Fig. 14 is a transverse vertical section of the form of car shown in Figs. 11 and 12; and Fig. 15 is a partial side elevation showing still another form of car.

Figure 4:
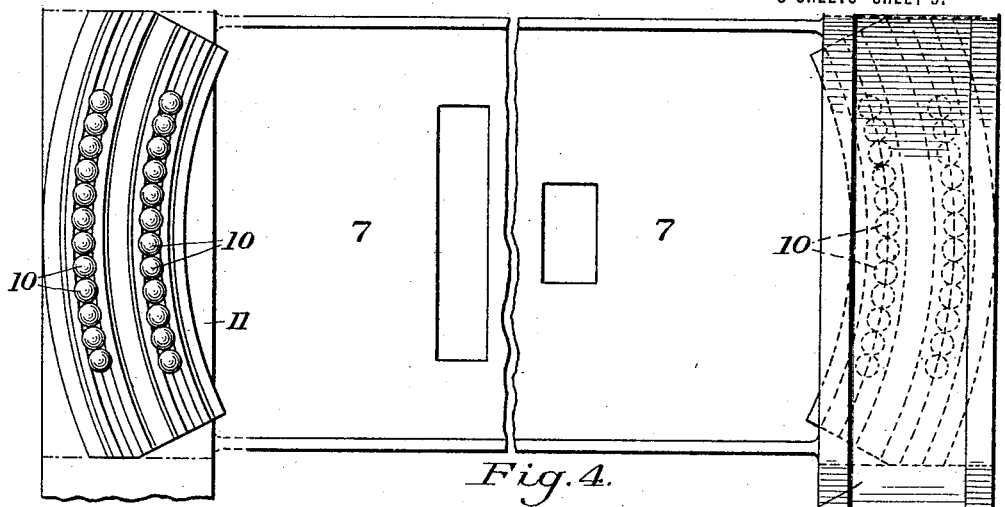
Fig. 4 is a plan view partly broken away, with certain parts of one end removed, of the swinging carriage or turn table.
Figure 5:
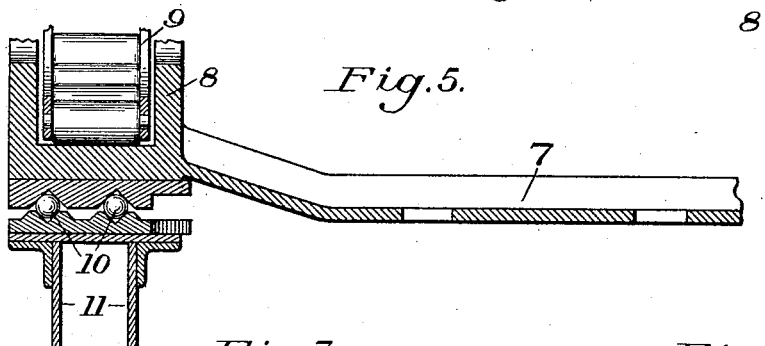
Fig. 5 is a partial sectional view of the same.
Figure 6:
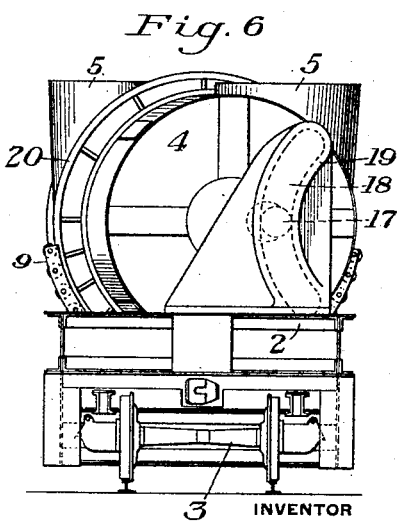
Figs. 6 and 7 are end views showing, respectively, the car and the tank or container in its normal and pouring positions.

My invention has relation to hot metal cars, such as are used for transferring hot metal about steel plants.

One object of my invention is to provide a car of large capacity in which the container is in the form of an elongated cylinder normally supported within the side lines of the car truck, and which can be swung laterally about a vertical axis to permit discharge of the contents of the container either at one side of the car or at both sides, if desired.

A further object of my invention is to provide a car of this general character having means whereby the container may be rotated about its longitudinal horizontal axis to effect the pouring. This preferably, but not necessarily, takes place simultaneously with the lateral swinging movement of the container.

A further object of my invention is to provide means whereby the container may be thoroughly drained in pouring, whether the container be arranged to pour at one or both ends. A still further object is to provide a car of this character in which the center of gravity of the container is at all times substantially in the line of the center of gravity of the car.

Other objects and advantages of my invention will hereinafter appear.

Referring first to that form of my invention shown in Figs. 1 to 7, inclusive, the numeral 2 designates the frame of a car mounted on the trucks 3, the said frame and trucks being, in general, of any suitable construction adapted to support the load to be carried.

The numeral 4 designates a hot metal container which is in the form of an elongated cylinder, which is closed, except for two pouring and filling openings 5, one located near each end portion of the container at opposite sides of its longitudinal axis and normally at the top of the container. The container may be of any suitable construction, such as an outer metal shell having a refractory lining 6.

The container is arranged longitudinally of the car with its own axis preferably normally at an oblique angle to the longitudinal axis of the car, as shown in full lines in Fig. 1. It is mounted to be swung laterally into a position such as indicated in dotted lines in Fig. 1, to thereby project the openings 5 beyond the side lines of the car. This mounting is shown as consisting of a swinging carriage or turn table which comprises a platform 7 (see Figs. 4 and 5) having at each end a runway 8, which is curved in a vertical plane. Secured to the container are roller cradles 9, which are mounted to travel in these runways 8. The carriage or turn table is supported on antifriction bearings of any suitable character, such as indicated at 10, upon the stands or supports 11, carried by the car-frame, these supports having runways for the antifriction bearings 10, and such runways being curved in a horizontal plane upon radii struck from the center of the platform 7, which is also the center of the container.

Means of any suitable character are provided for rotating the container. In the form shown in these figures, the container is provided with a central peripheral rack 12, whose teeth are engaged by a pinion 13, which is driven through the train of reducing gear 14 from the armature of an electric motor 15. This motor is shown as carried by the platform 7, from which it is underslung, as best shown in Figs. 2 and 3. The intermediate gearing between the armature shaft and the rack-engaging pinion 13 is also mounted on this platform, so that the gears maintain their proper driving relation during the lateral swinging movement of the container. This lateral swinging movement may also be imparted in a variety of ways. In the drawing, I have shown one end of the container as having a projection 16, terminating in a ball-shaped head 17, which engages a curved groove 18, in a fixed stand 19, secured to the car frame and projecting upwardly therefrom. In the normal position of the container shown in full lines in Figs. 1, 2 and 6, the ball head 17 is approximately at the center of the groove 18.

Figure 7:
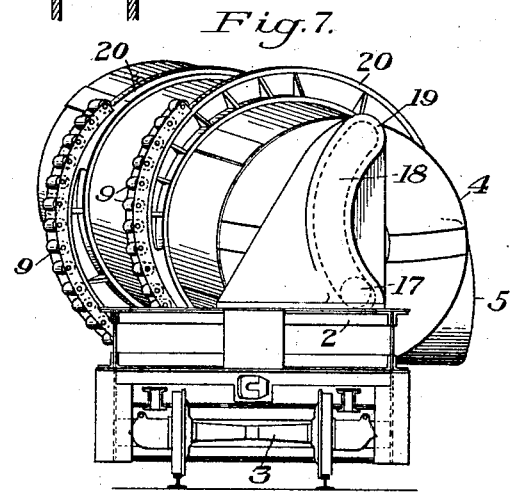

The container when being moved to dumping position is tipped in a vertical plane with respect to the central transverse axis thereof by means presently to be described; and when tipped toward one end, the ball head 17 will move downwardly in the groove 18, thereby causing the container to automatically swing with its carriage or turn table to the position shown in dotted lines in Fig. 1 and in end elevation in Fig. 7. When the container is tipped toward its opposite end, the ball head 17 moves upwardly in the groove 18 and effects a similar swinging of the container.

In order to effect the tilting movement just described, the container is mounted eccentrically on the roller cradles 9, before referred to, on the eccentric rings 20, which are secured to and surround the container. These two rings are of opposite eccentricity, as best shown in Figs. 1, 2 and 7. The sides of the rings 20 are parallel with the sides of the rack 12, and the pitch line of the teeth of the rack 12 are concentric with the roller bearing faces of the rings 20, so that the teeth of the rack 12 and pinion 13 will always be in perfect mesh. By reason of such eccentricity when the container is rotated about its longitudinal axis to pour out of one end thereof, that end of the container will be lowered and the opposite end raised. The reverse will take place when the container is rotated in the opposite direction to pour from the opening at its other end.

The operation will be readily understood from the foregoing. The car with its charge of hot metal is moved to the pouring station, and the motor 15 is actuated to rotate the container in the desired direction according to the end from which it is desired to pour, the pour at one end, as will have appeared, being at the opposite side of the car from the pour at the other end. This rotary movement of the container 4 through an arc of approximately 90° tilts the container toward the pouring end in the manner just described, and also effects its lateral movement also described. The tilting movement enables the container to be thoroughly drained in pouring. At the conclusion of the pouring operation, the motor is actuated to reverse the rotation and restore the container to its normal position within the side lines of the car, so that it can be moved along the track without interference. It will be noted that the center of gravity of the container is at all times substantially in a line with the center of gravity of the car, except as it may be slightly shifted by the endwise tilting movement in pouring.

In Figs 8, 9 and 10, I have shown another form of my invention which is generally similar to the form first described, except with respect to the means for rotating the container and effecting the lateral movement thereof. The container is mounted in substantially the same manner before described, and reference numerals similar to those before used are applied to corresponding parts in these figures with the letter "a" affixed thereto. In this form, each end of the container has secured thereto the bevel gear wheel 21, mounted concentrically with relation to the rings 20$^a$, but eccentrically with relation to the container, the wheel at one end having its teeth in mesh with the teeth of a curved rack 22, secured to the car frame below the gear wheel, while the gear wheel at the opposite end has its teeth in mesh with an overhung curved rack 23, carried on the bracket 24, at the opposite end portion of the car. 25 is an electric motor, which is connected by reducing gearing 26 to a transversely arranged screw shaft 27, carrying a traveling nut 28. This nut is connected by links 29 with a collar 30, which is loosely mounted on a stud 31, projecting from the adjacent end of the container.

When the motor is operated, it will cause the nut 28 to travel on the screw 27, thereby, through the links 29, pushing the container and its turn table mounting laterally to a position such as indicated in dotted lines in Fig. 8. At the same time, the container will be rotated through the action of the gears 21 and racks 22 and 23 to bring one of its openings 5$^a$ into pouring position. The same tilting movement is effected as in the first described form, through the action of the eccentric supporting rings 20$^a$.

In Figs. 11, 12, 13 and 14, I have shown a somewhat different mounting for the container and have also shown a different arrangement of gearing for swinging the container laterally and for rotating it about its horizontal axis.

In these figures, the parts corresponding to similar parts in the form first described are given the same reference characters with the letter "b" affixed thereto. In the form here shown, the turntable 32 is of complete circular form, thereby permitting a considerably greater lateral movement of the container, as will appear from Fig. 13. This turn table is actuated by an electric motor 33, which, through gearing 34, drives a short vertical shaft 35 (see Fig. 12) having a pinion 36, which meshes with peripheral rack teeth on the upper movable member 37 of the turn table. Instead of the roller cradles shown in the preceding figures, the eccentric rings 20$^b$ are supported on rollers 38, which are suitably mounted on the platform member of the turntable and are carried by the shafts 39, arranged to be rotated by an electric motor 40, suitably geared thereto. When these motors are actuated, they will rotate the rollers 38, and thereby rotate the container about its longitudinal axis.

Fig. 15 illustrates another form of my invention in which the construction is substantially the same as in Figs. 8, 9 and 10, except that upper and lower racks 23$^c$ are provided at each end, such as shown at one thereof. The upper rack at one end and the lower rack at the other end constitute a pair of racks, and are simultaneously in engagement with their respective gear wheels 21$^c$ at opposite ends of the container, either set of which can be engaged with the gears 21$^c$. For this purpose the upper and lower rack at each end are mounted on tilting bracket 41, pivoted at 42, and which can be swung in opposite directions by means of a shaft 43, provided with a hand wheel 44 to move the upper rack at one end and the lower rack at the other end into engagement with their respective gears 21$^c$. Parts in this figure which are similar to corresponding parts in Figs. 8, 9 and 10 have been given the same reference numerals with the letter "c" applied thereto.

It will be readily understood that the several forms of my invention which I have herein shown and described are illustrative only, and that, particularly within the scope of my broader claims, the container may be mounted in various ways, and various actuating means may be provided to secure the desired movements thereof, without departing from the spirit and scope of my invention, as defined in such claims.

The advantages of my invention will be apparent to those skilled in this art, since it provides a hot metal transfer car of large capacity, which is substantially closed and with which the heat losses in transfer may be reduced to a minimum, combined with the facility for ready manipulation to bring it into and out of pouring position. While I prefer to use a double-pour container, my broader claims are not limited thereto, since many of the advantages of the invention can be obtained by the use of a single-pour opening.

My invention provides a car which can be used not only as a hot metal car, but also as a cinder car. Also as a metal mixer.

Some of the features disclosed herein and directed more particularly to the location of the actuating mechanism at one end of the car are claimed in my co-pending application, Serial No. 332,254, filed October 21, 1919.

I claim:

1. A car for hot metal, cinder and the like, comprising a mounting, a container mounted thereon and arranged to be rotated about horizontal and vertical axes thereon, and means for simultaneously rotating said container about both of said axes, substantially as described.

2. A car for hot metal, cinder and the like, comprising a mounting, a container mounted thereon and arranged to be rotated about horizontal and vertical axes thereon, and means for simultaneously rotating said container about both of said axes, said container being of cylindrical form, substantially as described.

3. A car for hot metal, cinder and the like, comprising a truck and a container mounted thereon for lateral movement about a vertical axis, for rotary movement about a longitudinal axis, and also for tilting movement with respect to a transverse axis, substantially as described.

4. A car for hot metal, cinder and the like, comprising a truck and a container mounted thereon for rotary movement about a longitudinal axis, and also for tilting movement with respect to a transverse axis, and means for simultaneously rotating and tilting said container, substantially as described.

5. A car for hot metal, cinder and the like, comprising a mounting, a container mounted thereon and arranged to be rotated about a vertical axis and also to be tilted, and means for simultaneously rotating and tilting said container, substantially as described.

6. A car for hot metal, cinder and the like, comprising a mounting, a container mounted thereon and arranged to be rotated about horizontal and vertical axes and also to be tilted thereon, and means for simultaneously rotating said container about both of said axes and also for tilting the same, substantially as described.

7. A car for hot metal, cinder and the like, comprising a truck and a container mounted thereon for lateral movement about a vertical axis, for rotary movement about a horizontal longitudinal axis, and also for tilting movement with respect to the transverse axis, said container being of cylindrical tank form, substantially as described.

8. A car for hot metal, cinder and the like, comprising a truck, a cylindrical container arranged longitudinally of the truck, a mounting for the container whereby the latter may be swung laterally about a vertical center line to project an end thereof beyond the side line of the truck, means whereby the said container may also be rotated about its longitudinal axis, and means for simultaneously rotating the container about both axes, substantially as described.

9. A car for hot metal, cinder and the like, comprising a truck, a container arranged longitudinally of said truck, a mounting for the container whereby the latter may be swung laterally about a vertical center line to project an end thereof beyond the side line of the truck, and means whereby said container may also be rotated about its longitudinal axis, said container being of cylindrical tank form, and means for simultaneously rotating the container about both axes, substantially as described.

10. A car for hot metal, cinder and the like, comprising a truck, a cylindrical container arranged longitudinally of said truck, and a mounting for said container comprising a horizontally movable turn table, said turn table carrying supports in which the container may be tilted and rotated about its longitudinal axis, substantially as described.

11. A car for hot metal, cinder and the like, comprising a truck, a cylindrical container arranged longitudinally of said truck, and a mounting for said container comprising a horizontally movable turn table, said turn table carrying supports in which the container may be rotated about its longitudinal axis, together with means for tilting the container with respect to the transverse axis thereof, substantially as described.

12. A car for hot metal, cinder and the like, comprising a truck, a container arranged longitudinally of said truck, a mounting for the container whereby the latter may be swung laterally about a vertical axis to project an end thereof beyond the side line of the truck, and means whereby said container may also be rotated about its longitudinal axis, said container being of cylindrical tank form and having a pouring opening near each end thereof, substantially as described.

13. A car for hot metal, cinder and the like, comprising a truck, a cylindrical container arranged longitudinally of said truck, and a mounting for said container comprising a horizontally movable turn table, said turn table carrying supports in which the container may be rotated about its horizontal axis, said container having a pouring opening near each end thereof, substantially as described.

14. A car for hot metal, cinder and the like, comprising a truck, a cylindrical container arranged longitudinally of said truck, and a mounting for said container comprising a horizontally movable turn table, said turn table carrying supports in which the container may be rotated about its longitudinal axis, together with means for tilting the container with respect to the transverse axis thereof, said container having a pouring opening near each end thereof, substantially as described.

15. A car for hot metal, cinder and the like, comprising a truck, a cylindrical container arranged longitudinally of said truck, and a mounting for the container, said mounting comprising a horizontally movable turn table having antifriction supports upon which the container is rotatably mounted, substantially as described.

16. A car for hot metal, cinder and the like, comprising a truck, a cylindrical container arranged longitudinally of said truck, and a mounting for the container, said mounting comprising a horizontally movable turn table having antifriction supports upon which a container is rotatably mounted, said container having eccentric ring members which form its bearing on said supports, substantially as described.

17. A car for hot metal, cinder and the like, comprising a metal container of cylindrical form, a mounting for said container upon which it may be rotated about its longitudinal axis, and eccentric rings on said container forming a part of the mounting, said rings providing means whereby as the container is rotated it is also tilted about a transverse axis, substantially as described.

18. A car for hot metal, cinder and the like, comprising a metal container of cylindrical form, a mounting for said container upon which it may be rotated about its longitudinal axis, and eccentric rings on said container forming a part of the mounting, said rings being of opposite eccentricity, substantially as described.

19. A car for hot metal, cinder and the like, comprising a truck, a container mounted thereon and extending longitudinally thereof normally within the side lines of the truck, and means whereby the container may be simultaneously rotated and swung laterally to project its ends beyond such side lines for pouring, substantially as described.

20. A car for hot metal, cinder and the like, comprising a truck, a container mounted thereon and extending longitudinally thereof normally within the side lines of the truck, and means whereby the container may be swung laterally to project its ends beyond such side lines for pouring, together with means for rotating the container about its longitudinal axis and for tipping the container about a transverse axis as it is rotated, substantially as described.

21. A car for hot metal, cinder and the like, comprising a truck, a container mounted thereon and extending longitudinally thereof normally within the side lines of the truck, and means whereby the container may be swung laterally to project its ends beyond such side lines for pouring, said container having a pouring opening near each end, substantially as described.

22. A car for hot metal, cinder and the like, comprising a truck, a container mounted thereon and extending longitudinally thereof normally within the side lines of the truck, and means whereby the container may be swung laterally to project its ends beyond such side lines for pouring, together with means for rotating the container about its longitudinal axis, said container having a pouring opening near each end, substantially as described.

23. A car for hot metal, cinder and the like, comprising a truck, a container mounted thereon and extending longitudinally thereof normally within the side lines of the truck, and means whereby the container may be swung laterally to project its ends beyond such side lines for pouring, together with means for rotating the container about its longitudinal axis and for tipping the container about a transverse axis as it is rotated, said container having a pouring opening near each end, substantially as described.

24. A car for hot metal, cinders and the like, comprising a mounting, a container thereon, arranged to be rotated in opposite directions about horizontal and vertical axes, and means carried on the mounting for producing movement in either direction at will about both of said axes simultaneously, substantially as described.

25. A car for hot metal, cinders and the like, comprising a mounting, a container thereon arranged to be rotated in opposite directions about horizontal and vertical axes and tipped about a transverse axis, and means carried on the mounting for producing movement in either direction at will about all of said axes simultaneously, substantially as described.

26. A car for hot metal, cinders and the like, comprising a container mounted for rotation about a horizontal axis and also to swing about a vertical axis, and means whereby rotation about the horizontal axis also causes rotation about the vertical axis, substantially as described.

27. A car for hot metal, cinders and the like, comprising a container mounted for rotation about a horizontal axis and also to swing about a vertical axis, and means whereby rotation about the horizontal axis in either a clockwise or counter-clockwise direction from its normal position, causes the container to be swung in the same direction about its vertical axis, substantially as described.

In testimony whereof, I have hereunto set my hand.

RICHARD H. STEVENS.